United States Patent
Douglas

(10) Patent No.: US 10,964,124 B1
(45) Date of Patent: Mar. 30, 2021

(54) 3D IMAGING WITH ADVANCED VOXEL PROCESSING AND DYNAMIC FILTERING

(71) Applicant: Robert Edwin Douglas, Winter Park, FL (US)

(72) Inventor: Robert Edwin Douglas, Winter Park, FL (US)

(*) Notice: Subject to any disclaimer, the term of this patent is extended or adjusted under 35 U.S.C. 154(b) by 0 days.

(21) Appl. No.: 16/843,988

(22) Filed: Apr. 9, 2020

Related U.S. Application Data

(63) Continuation of application No. 15/904,092, filed on Feb. 23, 2018, now Pat. No. 10,586,400, and a continuation of application No. 16/752,662, filed on Jan. 26, 2020, now Pat. No. 10,657,731.

(51) Int. Cl.
*G06T 19/20* (2011.01)
*G06T 15/08* (2011.01)

(52) U.S. Cl.
CPC .............. *G06T 19/20* (2013.01); *G06T 15/08* (2013.01); *G06T 2219/2012* (2013.01); *G06T 2219/2016* (2013.01); *G06T 2219/2021* (2013.01)

(58) Field of Classification Search
None
See application file for complete search history.

(56) References Cited

U.S. PATENT DOCUMENTS

| | | | | |
|---|---|---|---|---|
| 6,765,570 | B1* | 7/2004 | Cheung | G06T 15/08 345/420 |
| 10,339,716 | B1* | 7/2019 | Powers | G06T 7/85 |
| 10,380,727 | B2* | 8/2019 | Poland | G06T 7/11 |
| 10,586,400 | B2* | 3/2020 | Douglas | G06T 15/08 |
| 10,657,731 | B1* | 5/2020 | Douglas | G06T 7/10 |
| 2007/0279436 | A1* | 12/2007 | Ng | G16H 50/50 345/624 |
| 2012/0232375 | A1* | 9/2012 | Zebaze | A61B 6/032 600/407 |
| 2014/0193336 | A1* | 7/2014 | Rousso | A61B 6/503 424/1.65 |
| 2016/0048984 | A1* | 2/2016 | Frigo | G06T 15/08 382/131 |
| 2018/0144539 | A1* | 5/2018 | Kredi | G06T 15/08 |

* cited by examiner

*Primary Examiner* — James A Thompson

(57) ABSTRACT

A 3D image processing system includes voxel adjustments based on radiodensity, filtering and segmentation, each of which may be selected, configured, and applied in response to controller-entered commands. In this disclosure, a method and apparatus for improved voxel processing and improved filtering is established. With regard to the improved voxel processing, a first group of voxels is changed in shape, size or orientation independently from a second group of voxels. For example, the volume is divided into groups and the dynamic filtering is performed. This improves visualization of 3D images by providing a greater extent of filtering while maintaining context of portions of the 3D image.

25 Claims, 10 Drawing Sheets

Table 500

| | A | B | C | D | E | F | G |
|---|---|---|---|---|---|---|---|
| 1 | Raw Data (Hounsfeld Unit) | Multiplier at time point #1 | Displayed Value at time point #1 | Multiplier at time point #2 Applied to Displayed Value #1 | Displayed Value at time point #2 | Multiplier at time point #3 Applied to Displayed Value #2 | Displayed Value at time point #3 |
| 21 | 20 | 1.2 | 24 | 1.2 | 28.8 | 1.2 | 34.56 |
| 22 | 21 | 1.2 | 25.2 | 1.2 | 30.24 | 1.2 | 36.288 |
| 23 | 22 | 1.2 | 26.4 | 1.2 | 31.68 | 1.2 | 38.016 |
| 24 | 23 | 1.2 | 27.6 | 1.2 | 33.12 | 1.2 | 39.744 |
| 25 | 24 | 1.2 | 28.8 | 1.2 | 34.56 | 1.2 | 41.472 |
| 26 | 25 | 1.2 | 30 | 1.2 | 36 | 1.2 | 43.2 |
| 27 | 26 | 1.2 | 31.2 | 1.2 | 37.44 | 1.2 | 44.928 |
| 28 | 27 | 1.5 | 40.5 | 1.5 | 60.75 | 1.5 | 91.125 |
| 29 | 28 | 1.5 | 42 | 1.5 | 63 | 1.5 | 94.5 |
| 30 | 29 | 1.5 | 43.5 | 1.5 | 65.25 | 1.5 | 97.875 |
| 31 | 30 | 1.5 | 45 | 1.5 | 67.5 | 1.5 | 101.25 |
| 32 | 31 | 1.5 | 46.5 | 1.5 | 69.75 | 1.5 | 104.625 |
| 33 | 32 | 1.5 | 48 | 1.5 | 72 | 1.5 | 108 |
| 34 | 33 | 1.5 | 49.5 | 1.5 | 74.25 | 1.5 | 111.375 |
| 35 | 34 | 2 | 68 | 2 | 136 | 2 | 272 |
| 36 | 35 | 2 | 70 | 2 | 140 | 2 | 280 |
| 37 | 36 | 2 | 72 | 2 | 144 | 2 | 288 |
| 38 | 37 | 2 | 74 | 2 | 148 | 2 | 296 |
| 39 | 38 | 2 | 76 | 2 | 152 | 2 | 304 |
| 40 | 39 | 2 | 78 | 2 | 156 | 2 | 312 |
| 41 | 40 | 2 | 80 | 2 | 160 | 2 | 320 |

Figure 5

Area of discontinuity seen 800

Area of discontinuity seen

3D IMAGING WITH ADVANCED VOXEL PROCESSING AND DYNAMIC FILTERING

TECHNICAL FIELD

Aspects of the present disclosure are generally related to processing three-dimensional image data.

BACKGROUND

Known techniques for 3D viewing of medical images are described in U.S. Pat. No. 9,349,183, Method and Apparatus for Three Dimensional Viewing of Images, issued to Douglas, U.S. Pat. No. 8,384,771, Method and Apparatus for Three Dimensional Viewing of Images, issued to Douglas, Douglas, D. B., Petricoin, E. F., Liotta L., Wilson, E. D3D augmented reality imaging system: proof of concept in mammography. Med Devices (Auckl), 2016; 9:277-83, Douglas, D. B., Boone, J. M., Petricoin, E., Liotta, L., Wilson, E. Augmented Reality Imaging System: 3D Viewing of a Breast Cancer. J Nat Sci. 2016; 2(9), and Douglas, D. B., Wilke, C. A., Gibson, J. D., Boone, J. M., Wintermark, M. Augmented Reality: Advances in Diagnostic Imaging. Multimodal Technologies and Interaction, 2017; 1(4):29.

SUMMARY

All examples, aspects and features mentioned in this document can be combined in any technically possible way.

In accordance with an aspect an apparatus comprises: a controller; and an image processing system that generates a three-dimensional image comprising voxels corresponding to image data of a scanned volume, the image data comprising radiodensity values, the image processing system comprising visual representation adjustment logic that adjusts selected ones of the voxels based on selected ones of the radiodensity values, wherein the visual representation adjustment logic is configured in response to commands provided via the controller. Some implementations further comprise segmentation logic that performs segmentation, wherein the segmentation logic is configured in response to commands provided via the controller. Some implementations further comprise filtering logic that performs filtering, wherein the filtering logic is configured in response to commands provided via the controller. In some implementations the visual representation adjustment logic changes a grayscale value of the selected voxels. In some implementations the visual representation adjustment logic changes a color value of the selected voxels. In some implementations the visual representation adjustment logic increases dynamic range of the selected voxels. In some implementations the visual representation adjustment logic changes size of the selected voxels. In some implementations the visual representation adjustment logic changes shape of the selected voxels. In some implementations the visual representation adjustment logic changes orientation of the selected voxels. In some implementations the visual representation adjustment logic demarks the selected voxels with color. In some implementations the visual representation adjustment logic is temporally adjusted to present versions of an image corresponding to different configuration settings. In some implementations the filtering logic removes some of the selected voxels from the three-dimensional image. In some implementations the filtering logic is temporally adjusted to present versions of an image corresponding to different filter configuration settings. In some implementations the segmentation logic classifies a voxel under consideration based on the tissue type of nearest neighbor voxels in a matrix. In some implementations the segmentation logic fills a gap in a structure. In some implementations the image processing system generates multiple images from the image data using different configuration settings, and combines the multiple images to generate the three-dimensional image as a composite image.

In accordance with an aspect, a method comprises: in an image processing system, generating a three-dimensional image comprising voxels corresponding to image data of a scanned volume, the image data comprising radiodensity values, wherein generating the three-dimensional image comprises: configuring visual representation adjustment logic with configuration settings in response to commands provided via a controller; and adjusting selected ones of the voxels based on selected ones of the radiodensity values in accordance with the configuration settings. Some implementations further comprise configuring segmentation logic in response to commands provided via the controller, and performing segmentation. Some implementations further comprise configuring filtering logic in response to commands provided via the controller, and performing filtering. In some implementations adjusting selected ones of the voxels comprises changing a grayscale value of the selected voxels. In some implementations adjusting selected ones of the voxels comprises changing a color value of the selected voxels. In some implementations adjusting selected ones of the voxels comprises increasing dynamic range of the selected voxels. In some implementations adjusting selected ones of the voxels comprises changing size of the selected voxels. In some implementations adjusting selected ones of the voxels comprises changing shape of the selected voxels. In some implementations adjusting selected ones of the voxels comprises changing orientation of the selected voxels. In some implementations adjusting selected ones of the voxels comprises demarking the selected voxels with color. In some implementations adjusting selected ones of the voxels comprises temporally adjusting configuration values to present versions of an image corresponding to different configuration settings. Some implementations comprise the filtering logic removing some of the selected voxels from the three-dimensional image. Some implementations comprise temporally adjusting the filtering logic to present versions of an image corresponding to different filter configuration settings. Some implementations comprise the segmentation logic classifying a voxel under consideration based on the tissue type of nearest neighbor voxels in a matrix. Some implementations comprise the segmentation logic filling a gap in a structure. Some implementations comprise the image processing system generating multiple images from the image data using different configuration settings, and combining the multiple images to generate the three-dimensional image as a composite image.

BRIEF DESCRIPTION OF THE FIGURES

FIG. 5 illustrates mathematical adjustments of voxels to enhance discrimination between voxels based on grayscale values.

DETAILED DESCRIPTION

Figure 1:
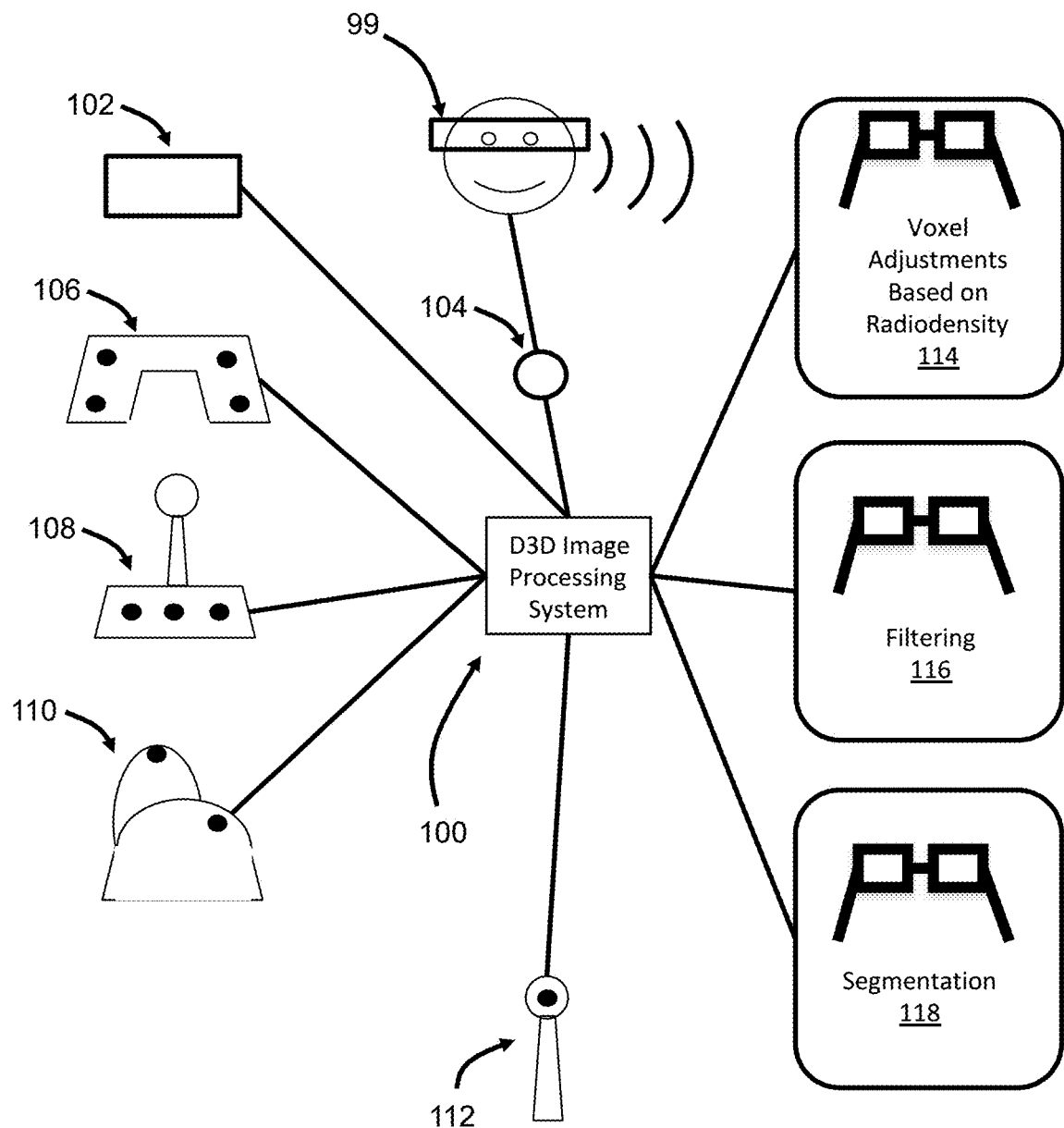
FIG. 1 illustrates a D3D image processing system.

Some aspects, features, and implementations described herein may include machines such as computers, electronic components, optical components, and processes such as computer-implemented steps. It will be apparent to those of ordinary skill in the art that the computer-implemented steps may be stored as computer-executable instructions on a non-transitory computer-readable medium. Furthermore, it will be understood by those of ordinary skill in the art that the computer-executable instructions may be executed on a variety of tangible processor devices. For ease of exposition, not every step, device or component that may be part of a computer or data storage system is described herein. Those of ordinary skill in the art will recognize such steps, devices and components in view of the teachings of the present disclosure and the knowledge generally available to those of ordinary skill in the art. The corresponding machines and processes are therefore enabled and within the scope of the disclosure.

In a D3D imaging system, a radiologist uses a controller to manipulate 3D (three-dimensional) images that may be viewed via special glasses or a VR (virtual reality) headset. The 3D images may be generated from radiological scan data, for example and without limitation from X-ray radiography, CT (computed tomography), PET (positron emission tomography), or MRI (magnetic resonance imaging). There will normally be a linear relationship between density or radiodensity values from the scan data and the grayscale values assigned to corresponding voxels of the 3D images. Advantages of existing examples may include improved depth perception and an improved human machine interface. Still, there are several challenges faced with this approach. First, an area of interest (e.g. tumor) may be in close proximity to structures that are similar in composition/density. Isolating the area of interest for better examination may be difficult. Second, many soft tissues in the body are mobile and deformable, so it can be difficult to achieve the best orientation to properly compare the tumor at multiple time points. Efficiently aligning the orientation to do so may be difficult. Third, certain portions of a tumor can respond to treatment and decrease in size while other portions of a tumor demonstrate increases in size. The pattern of tumor shrinkage has important prognostic implications. Furthermore, composition and complex morphologic features including speculations (spikes extending from the surface), irregular margins and enhancement also have important implications. Consequently, there is a need for a system that facilitates recognition of the subtle, yet important changes in size, shape and margins. Fourth, a patient with metastatic cancer has several areas of interest in different areas of the body. It is difficult and time consuming to find each of the areas of interest at every time point to determine interval change. Consequently, there is a need for a system that enables the observer to do this efficiently.

FIG. 1 illustrates an improved D3D image processing system 100 and various types of controllers and a VR headset 99 that interface with the D3D image processing system. A wide variety of controllers may be utilized, possibly including but not limited to one or more of a keyboard 102, microphone 104 (for voice control), hand held game-type controller 106, joy stick 108, high-end mouse 110, and wand 112. The controllers are used to enter commands that control an application that processes 3D image data and displays that 3D image data. As will be explained in greater detail below, the controllers are used to select, configure and implement image processing techniques including: voxel adjustments based on radiodensity 114; filtering 116; and segmentation 118.

Figure 2:
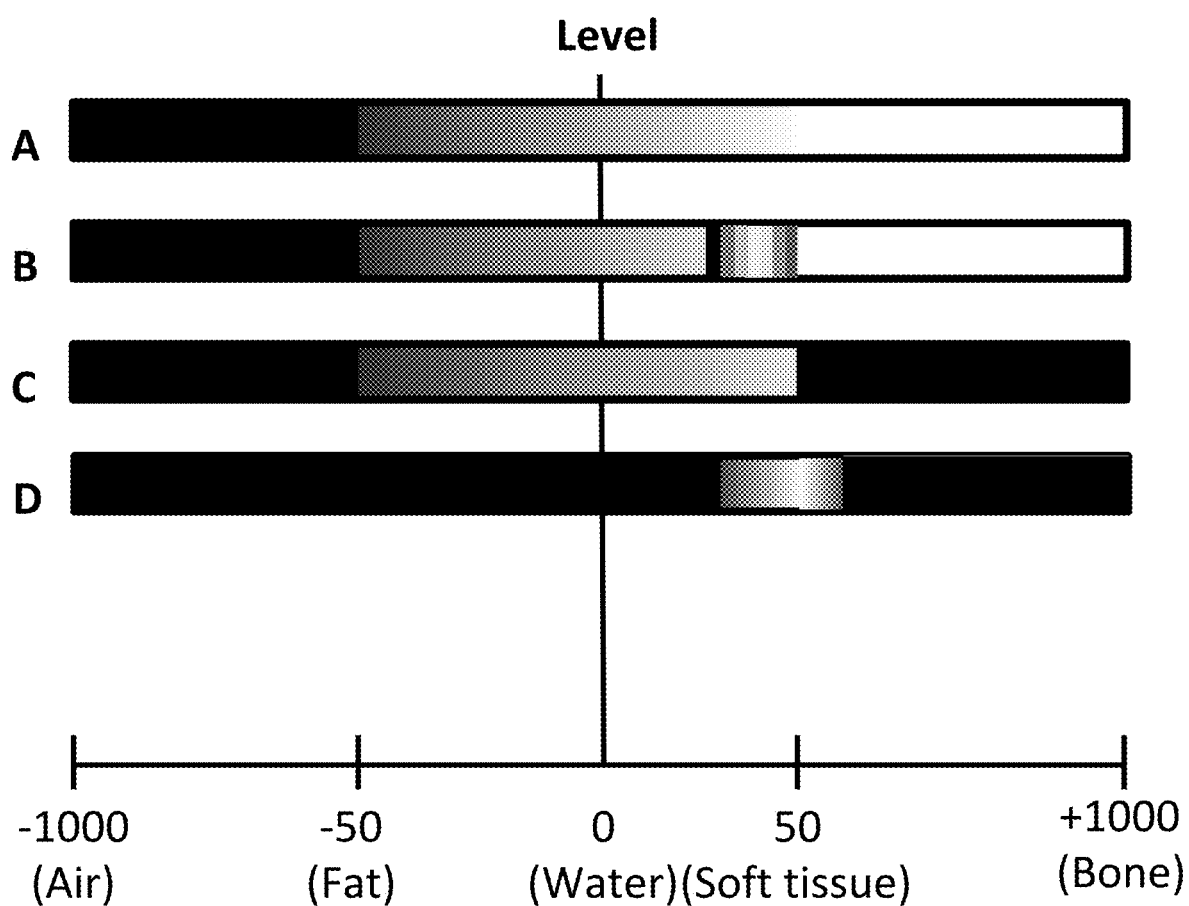
FIG. 2 illustrates aspects of voxel adjustments based on radiodensity in greater detail.

Referring to FIG. 2, an aspect of voxel adjustments based on radiodensity is grayscale and color adjustments. Raw 3D image data may include radiodensity values for locations in a scanned volume. Initially, grayscale and/or color values that are linearly related to radiodensity values may be assigned to voxels of an image corresponding to the 3D image data. Grayscale and/or color values corresponding to selected radiodensity values may then be adjusted for image enhancement. In the illustrated example, relative radiodensity values are used, namely HU (Houndsfeld Units). Initially assigned grayscale values may be linearly related to the HU values. Controller-entered commands enable the radiologist to independently adjust the relationship between HU values and grayscale and/or color values, e.g. from linear to non-linear. This may advantageously enhance presentation of tissue types of interest. In figure line A of the illustrated example, air within the body is initially shown in grayscale as black, whereas bone is shown as white. In line B, false color has been added to a region corresponding to an HU range that represents soft tissue. Selection, configuration, and application occur in response to controller-entered commands. In line C, grayscale values corresponding to HU values above a specified level have been changed to black (or not included in the voxel set displayed). In line D, grayscales values both above and below an HU range have been changed to black (or not included in the voxel set displayed). Tissues and other features may be distinguished based on radiodensity. Consequently, features and tissues may be selected, enhanced, and excluded based on radiodensity.

Although radiodensity is described herein as a basis for selection, it should be understood that a variety of related values, analogs, or proxies could be used instead of, or to represent, radiodensity. For example, and without limitation, tissue density could be used for selection. Further, a grayscale value, or range of values, could be directly selected and adjusted. The term radiodensity as used herein is intended to encompass all related values, analogs, and proxies.

Another aspect of voxel adjustments based on radiodensity is increasing the dynamic range of the displayed voxels. A process to achieve this may involve the following steps: selecting a volume of interest; removing all external tissue; setting a lower bound level of interest and a top bound; removing all tissue external to these bounds; extending the bounds by a factor of a selected factor (e.g., 2 or 10); and interpolating voxel grayscale values between the two bounds. This will have the effect of increasing dynamic range. Humans can only distinguish 7-8 bits of grayscale. This expansion of the upper/lower bounds would distinguish 10 bits or more, thus enabling the possibility of earlier and/or improved detection rate of tumors.

Figure 3A:
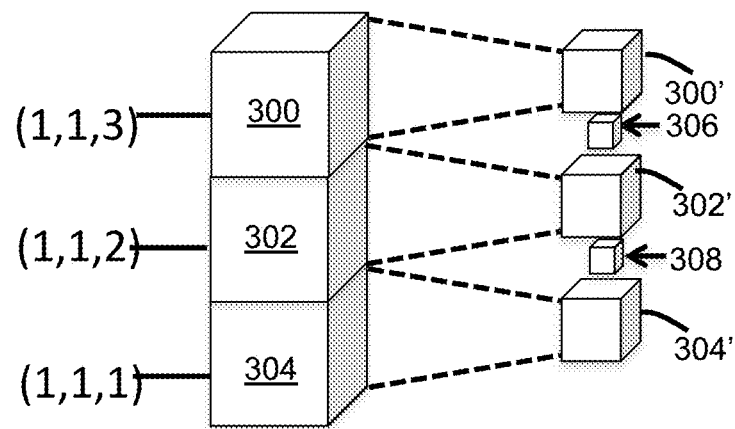
FIGS. 3A, 3B, and 3C illustrate adjustment of voxel size, shape, and orientation, respectively.

As shown in FIG. 3A, another aspect of voxel adjustments based on radiodensity is changing voxel size via controller-entered commands. For example, voxels having a selected radiodensity, or within a selected range, are adjusted in size by a selected magnitude. This technique may be used to cause a corresponding tissue type to be presented as semi-transparent. In the illustrated example, voxels 300, 302, 304 are reduced in size, yielding corresponding voxels 300', 302', 304', thereby permitting visualization of voxels 306, 308 that are more distant from the viewing point, i.e. deeper in the volume. Consequently, features can be seen that would otherwise have been occluded by the size-adjusted voxels in the near field of view.

Figure 3B:
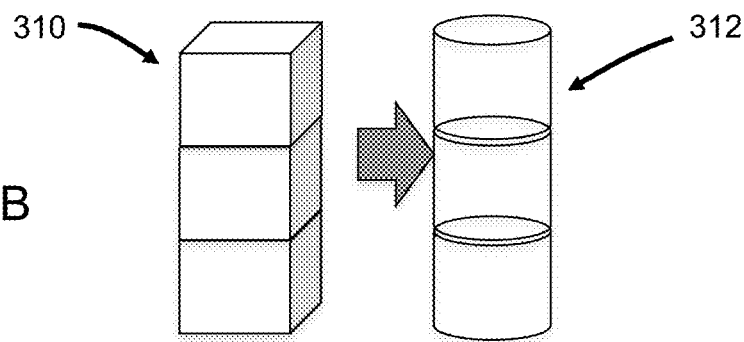

Referring to FIG. 3B, another aspect of voxel adjustments based on radiodensity is changing the shape of voxels via controller-entered commands based on radiodensity or some other basis. In the illustrated example, standard cubic voxels 310 having a selected radiodensity, or within a selected range, are adjusted to generate corresponding cylindrical voxels 312. Voxel shape may be selected to allow a smoother presentation of a feature being observed. For example, blood vessels could be better represented by cylindrical voxels as opposed to a column of cubes.

Figure 3C:
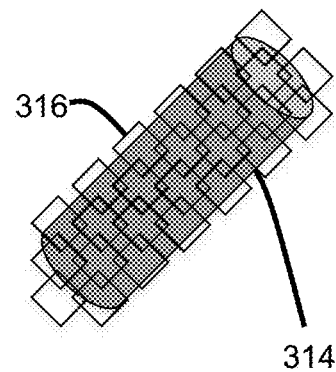

Referring to FIG. 3C, another aspect of voxel adjustments based on radiodensity is changing voxel orientation via controller-entered commands. In the illustrated example voxel orientation is changed from alignment with standard X, Y, Z axes as shown in FIG. 3A, to a slanted coordinate system that more closely aligns with the with the patient's anatomy. For example, voxel orientation may be changed to more closely represent the curvature of body contents to include tissues or surgical devices. In the illustrated example the voxel orientation is adjusted relative to a blood vessel 314 by adjusting axes of the sides or edges 316 of the voxels. Voxels associated with the blood vessel or other tissue types may be selected based on radiodensity or some other basis.

Figure 4A:
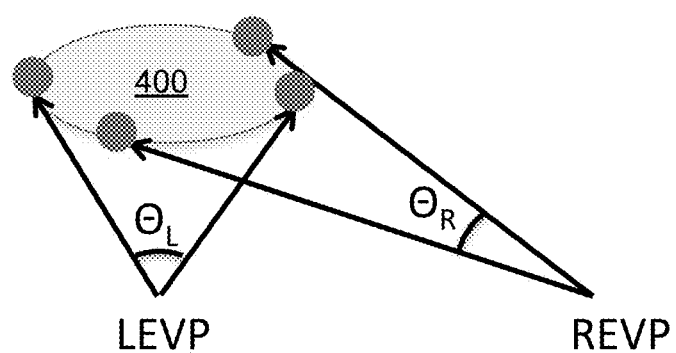
FIGS. 4A and 4B illustrate feature demarcation.
Figure 4B:
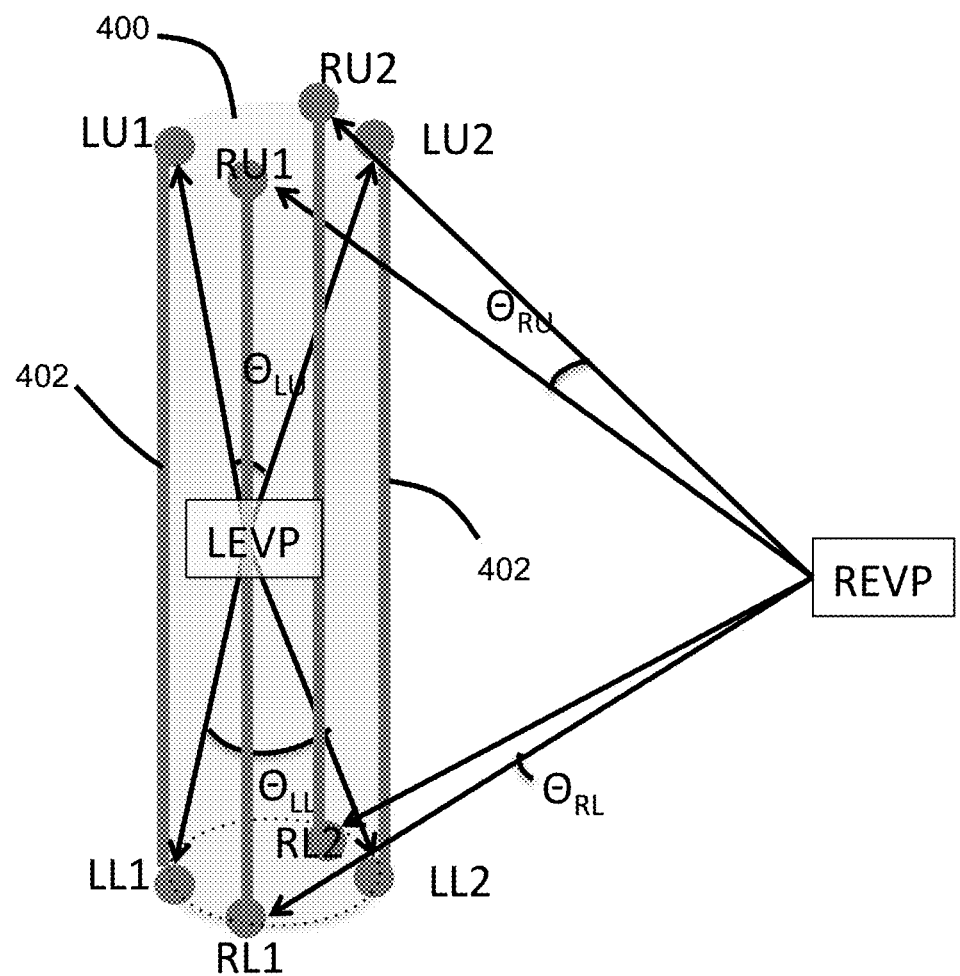

Referring to FIGS. 4A and 4B, another aspect of voxel adjustments based on radiodensity is feature demarcation. In the illustrated example, voxels associated with a vein 400 are demarked with blue lines 402 to enhance visualization. Although a vein is shown as an example, a wide variety of features and tissues may be demarked. Further, a wide variety of colors could be used, for example and without limitation, red lines could be generated to demark arteries. This is one of several potential uses of false color to facilitate medical personnel understanding of complex anatomy. Selection of whether to apply false color and to which types of tissue would be via a controller at the discretion of the medical personnel viewing the images. Voxels associated with the vein may be selected based on radiodensity or some other basis.

Some implementations may include showing the volume subtended by a cursor during review. This would permit, for example, an opportunity for the radiologist to ensure a thorough examination had been conducted and see if any regions had been missed. In some implementations, the techniques could include designating a volume of interest designated by a colored cursor for subsequent review. For medical images captured over time following an injection of any contrast material, color may be used to indicate presence and flow of the contrast material over time. Options include: combining the traces from the multiple images to show the blood vessel structure through which the contrast material moved; providing, at direction of the radiologist, time tags at point(s) of furthest movement of contrast material along each of the blood vessel's paths at each time interval; highlighting by color any connected blood vessels wherein no contrast has flowed as a potential indicator of blockage; and calculating, at direction of the radiologist, the volume of blood by time period for designated blood vessel(s) and display. In some implementations, the techniques could include for cases wherein there have been multiple sets of medical images taken over different time periods and for which a 3D volume of a tissue mass of interest has been recorded, providing the following: registration of the two (or more) volumes using the same metric system; superimposing the volumes and highlight by color (or other means such as flashing) the volumetric differences; and providing a histogram of volume of tissue of interest to quantify changes in size of the different tissue(s) within the cursor at the different times of imaging.

Referring to FIG. 5, another aspect of voxel adjustments based on radiodensity is enhanced voxel discrimination. The illustrated table 500 includes multipliers that enhance discrimination between voxels having near, but different, radiodensity and grayscale values. Voxels with Hounsfeld units of measure 25 (and associated grayscale) are multiplied by 1.2; voxels with Houndsfeld units of 30 (and associated grayscale) are multiplied by 1.5; voxels with Houndsfeld units of 35 (and associated grayscale) are multiplied by 2.0. Any of a wide variety of mathematical adjustments could be used, e.g. the table could be additive instead of multiplicative. Variations may include application of linear or non-linear functions. For example, the lii function (mX+b) could hive the variable 'm' (i.e., slope) adjusted from a low slope to higher slope. The non-linear function could be parabolic ($aX^2+bX+c$) (or other) where X would be the original grayscale. For other implementations, there could be a step increase. This is one of several ways to increase the ability to visually perceive small differences in radiodensity by adjusting the corresponding grayscale values, thereby improving visualization of the anatomy.

The mathematical adjustments may be temporally adjusted in response to controller-entered commands. The illustrated example includes three temporal multiplier adjustments that are iterated. In some implementations, if filtering results in display of a fraction/percent of the voxels, then the display could alternate display of voxels not currently to be displayed at selected time intervals. In some implementations, color could be added, such as rainbow, to particular ranges to enhance visibility.

Figure 6:
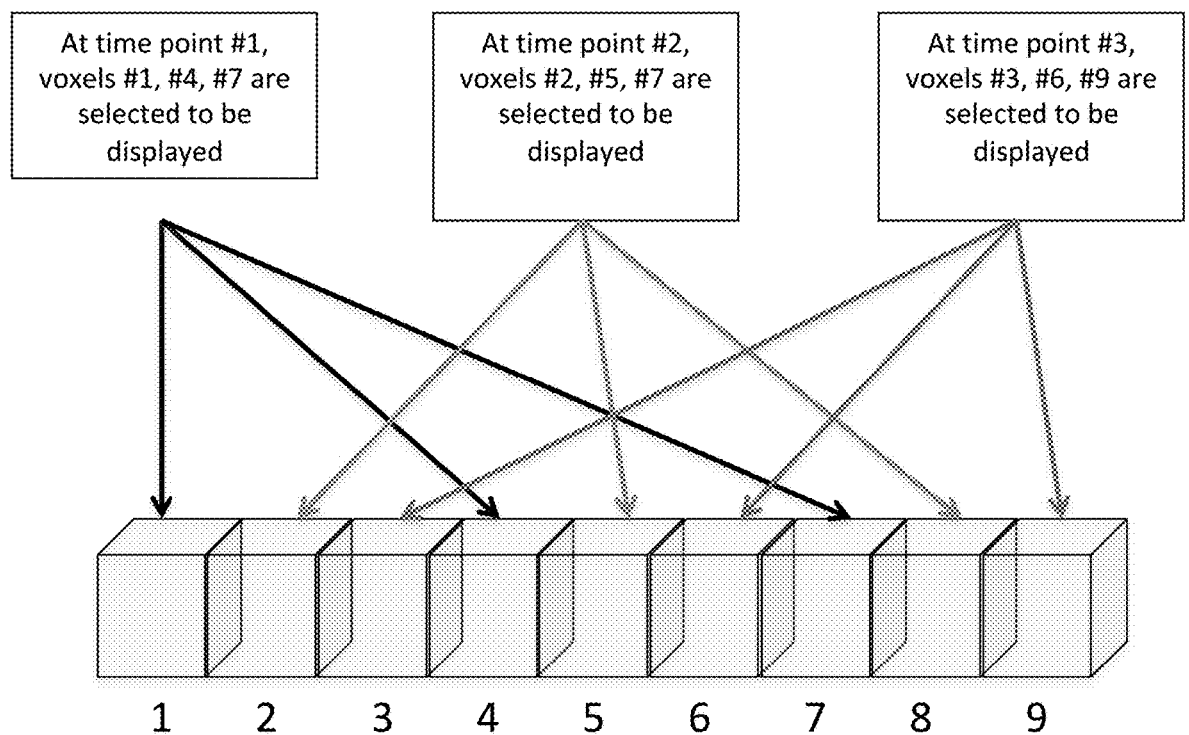
FIG. 6 illustrates aspects of filtering in greater detail.

FIG. 6 illustrates aspects of filtering in greater detail. In the illustrated example the filter is configured to select ⅓rd of the voxels for display at a given time. Specifically, every third voxel in a row of nine voxels numbered 1 through 9 is selected. Further, the filter temporally adjusts which ⅓rd of the voxels is selected for display at time points #1, #2, and #3 such that different sets of voxels are selected for display at different points in time. It may be advantageous to display only a portion of the voxels that represent a particular feature or tissue, e.g., air or fat. In the illustrated example only ⅓rd of the voxels of a certain radiodensity, and thus grayscale value, are shown at any one time. This option could also alternate which ⅓rd would be displayed over time. Note that the ⅓rd would not be a fixed fraction but one that was selectable.

Figure 7:
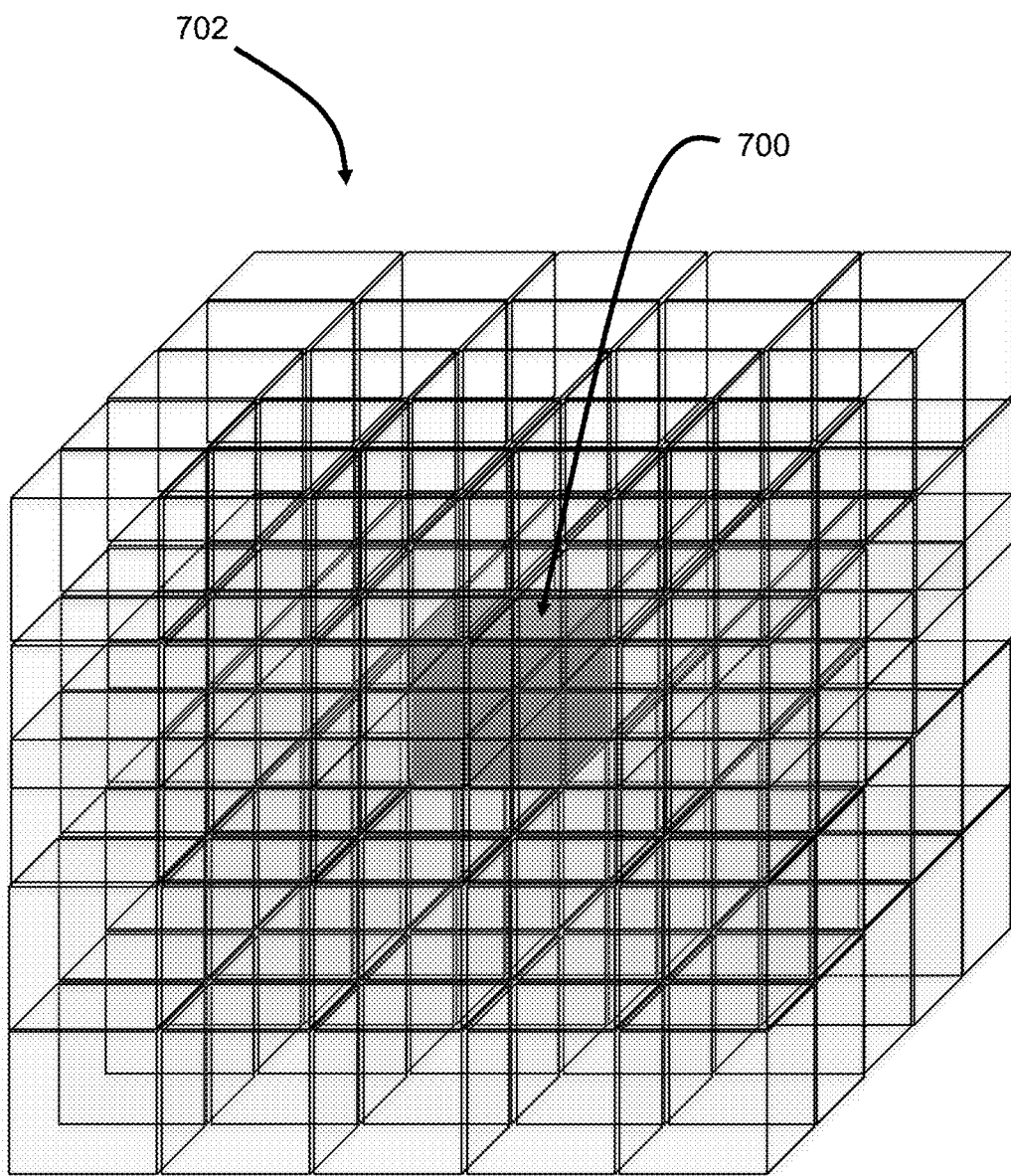
FIG. 7 illustrates an aspect of segmentation in which a voxel is classified based on the type of tissue of its nearest neighbor voxels.

FIG. 7 illustrates an aspect of segmentation in greater detail. In the illustrated example the tissue type of a voxel 700 under consideration is classified based on the tissue type of nearest neighbor voxels in a matrix. Although a 5×5×5 matrix 702 is shown, matrices of other sizes may be used, or adjacent voxels may be considered as nearest neighbors. Moreover, the set or matrix of voxels is not necessarily arranged in a cube. The 124 nearest neighbor voxels in the 5×5×5 matrix 702 are already classified with the same tissue type, so voxel 700 is likewise classified. Selection and configuration of segmentation algorithms would be via a controller at the discretion of the medical personnel viewing the images.

Figure 8A:
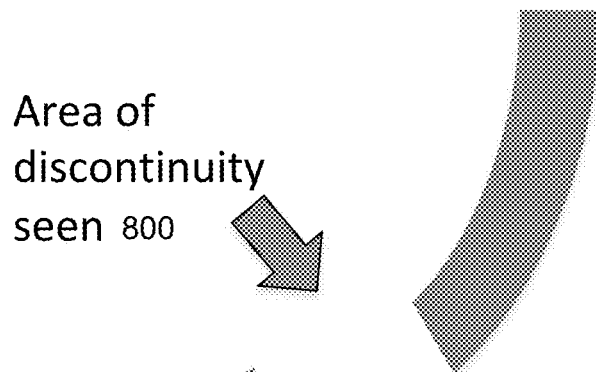
FIGS. 8A and 8B illustrate aspects of advanced segmentation wherein gaps in a vascular structure are filled.
Figure 8B:
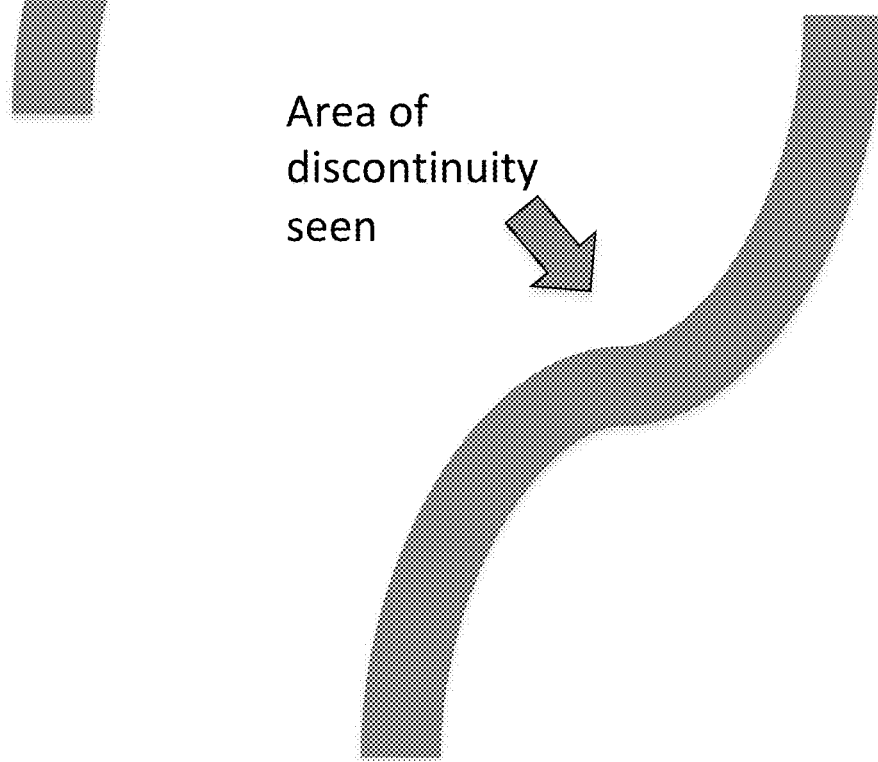

FIGS. 8A and 8B illustrate another aspect of segmentation. In the illustrated example, a gap 800 in a vascular structure is filled. There can be instances where a portion of certain connected tissue is not properly segmented when 2D algorithms are applied to 3D medical images. Vascular structure presents key challenges due to its curved nature within the body; it does not necessarily conform with a 3D grid structure. Advanced segmentation algorithms can be applied to grow the vascular structure from what is shown in FIG. 8A to what is shown in FIG. 8B. Selection of whether to apply advanced segmentation algorithms would be via a controller at the discretion of the medical personnel viewing the images.

Figure 9:
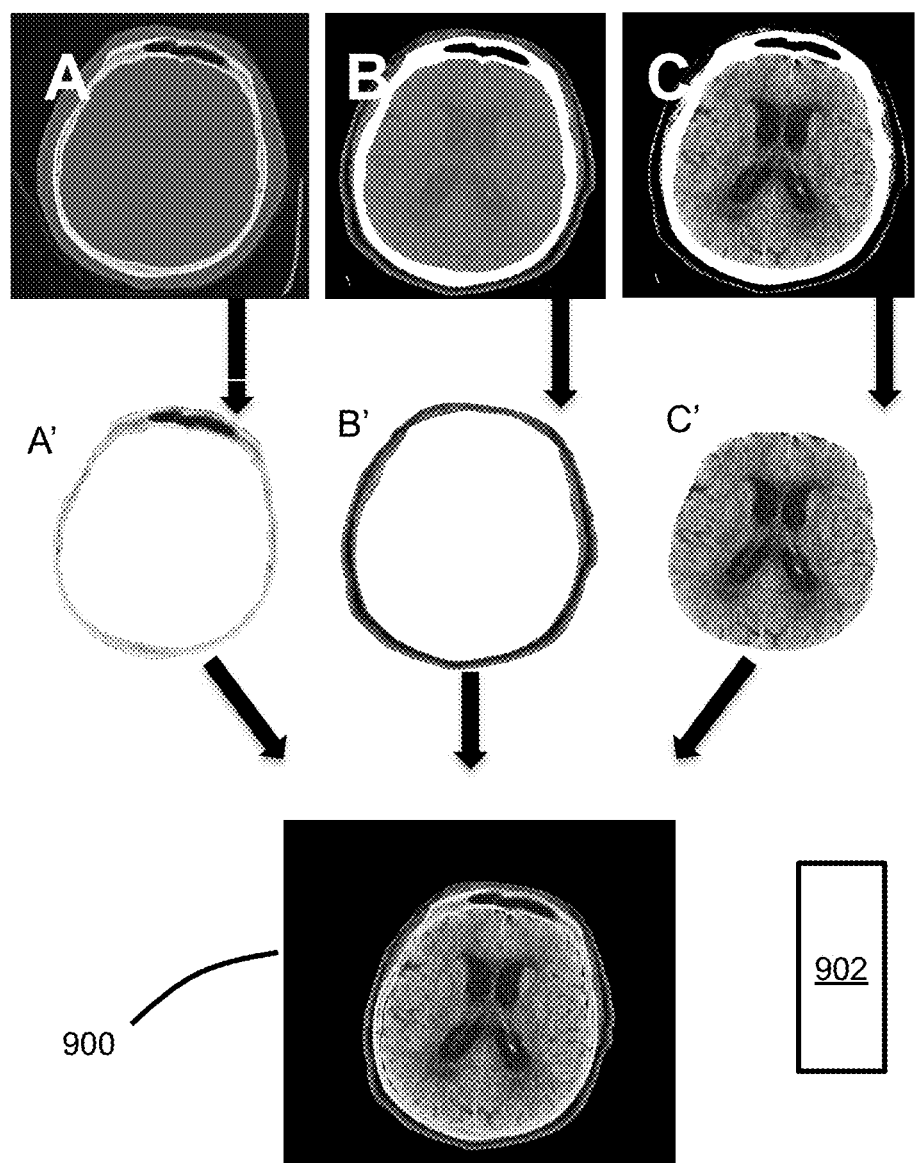
FIG. 9 illustrates use of controller-entered commands to process and combine three axial CT images of the head using the described image processing techniques.

FIG. 9 illustrates use of controller-entered commands and image processing logic to generate three axial CT images of the head and combine features extracted therefrom to generate a composite image. Images A, B, and C are generated with any combination of the image processing techniques described above. Bone algorithm image A demonstrates optimal visualization of the calvarium. Grayscale level adjustments based on radiodensity have been configured to optimize visualization of the cancellous bone within the calvarium (window level of 360 and window width of 3400). A side-effect is poor visualization of the scalp and almost no detail of the brain. The brain tissue cannot even be distinguished from the cerebrospinal fluid (CSF). Soft tissue algorithm image B is generated from the same raw image data by grayscale level adjustments based on radiodensity to optimize visualization of the scalp (window level of 40 and window width of 350). Soft tissue algorithm image C is generated from the same raw image data by grayscale level adjustments based on radiodensity to optimize visualization of the brain (window level of 30 and window width of 100).

The features of interest that have been visually optimized in images A, B, and C may be selected and extracted to generate a corresponding set of extracted feature images A', B', and C'. The extracted feature images may then be combined to generate a composite image 900. In the illustrated example, each extracted feature image includes unique tissue or tissues within the set of extracted feature images so there is no overlap when the three extracted feature images are combined to generate the composite image that represents all tissues. However, overlapping voxels having different values could be resolved algorithmically. Advantageously, the image processing steps are efficiently implemented in response to controller-entered commands based on a visual/graphical interface, e.g. via the VR headset.

Another aspect of visualization is the capability to combine findings with structured reporting. In some implementations, this could include displaying a list 902 of items which could be digitally marked by the radiologist using the 3D controller. The list of items could be unique to each item on the radiologist review checklist. In some implementations, the list presented on the 3D head display unit or the 2D display. Items which had been digitally marked would be automatically included in the report. In some implementations, a list of frequently used phrases for each item on the radiologist review checklist could be displayed at the direction of the radiologist who could then digitally mark any of the relevant phrases. Phrases which had been digitally marked would be automatically included in the report.

Another aspect of visualization is changing viewing perspective. In some implementations, a selected image, volume, feature, tissue, voxel set, or voxel is automatically re-centered or re-located to enhance radiologist orientation of location within the volume being examined. Examples of auto re-location include, but are not limited to, the following: the viewing perspective could be re-located to an initial viewing point of an image set; and the viewing perspective could be re-located to additional point(s) designated by the radiologist during the course of the examination. In some implementations, the cursor color or shape could correspond to pre-selected conditions, for example, but not limited to: review checklist items; types of tissue of concern; and regions for collaboration between medical personnel.

Another aspect of visualization is the capability to switch between various dimensional views (i.e., change back and forth between viewing 3D volume and 2D slices). In some implementations, selection of the 2D slice could be based on, but not limited to: the center point of the 3D cursor; a point within the 3D volume designated by the radiologist. In some implementations, the 3D controller to scroll through the slices.

Figure 10:
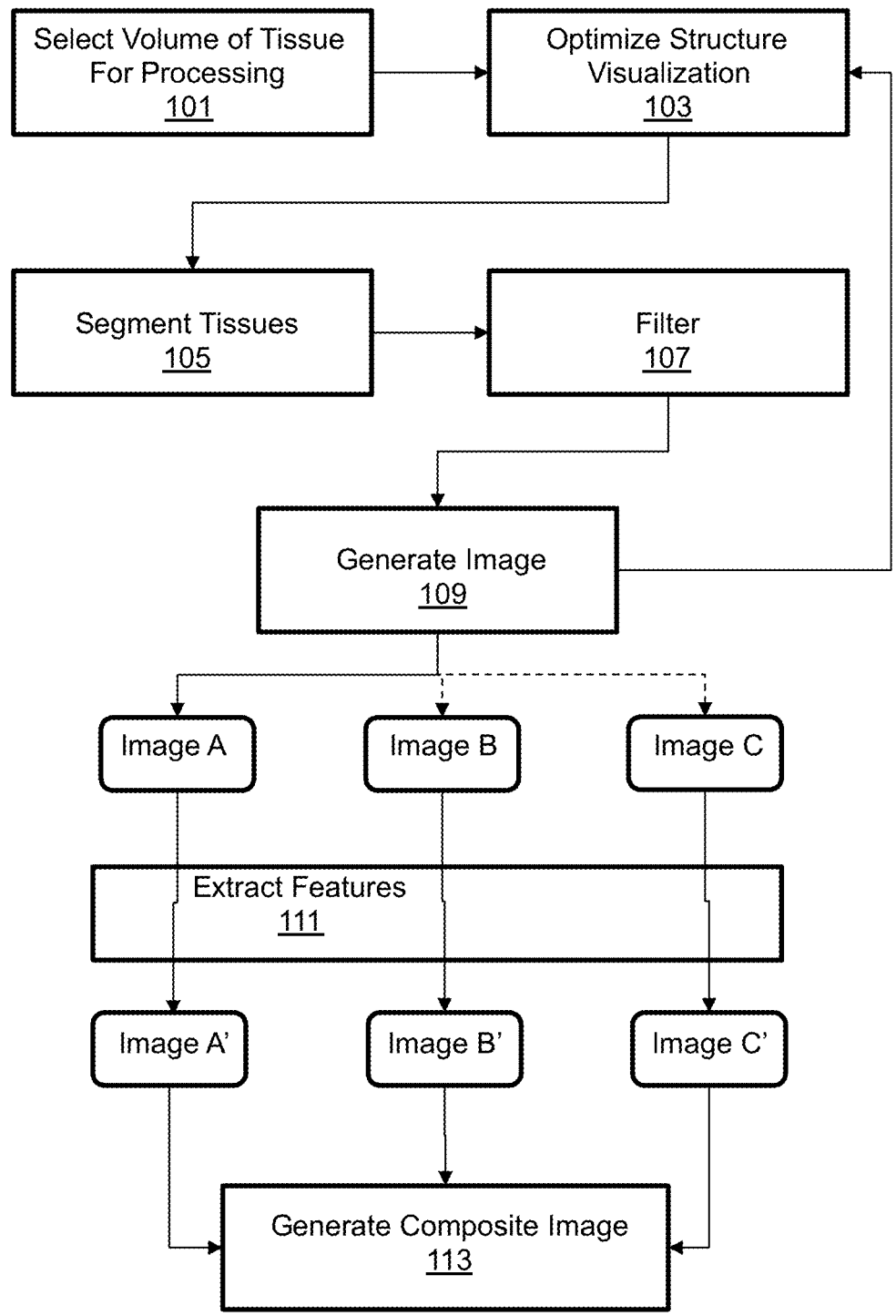
FIG. 10 is a flow diagram of procedural steps in accordance with aspects of the invention.

FIG. 10 illustrates a method in accordance with aspects of the invention. Procedurally, a volume of tissue within the body may initially be selected for processing in step 101. Raw scan data is retrieved for the selected volume, and one or more processing algorithms may be selected, configured, and applied. For example, one or more voxels adjustments based on radiodensity may be implemented to enhance one or more features of interest and optimize structure visualization as shown in step 103. Further, one or more segmentation algorithms may be selected, configured, and applied to segment tissues as shown in step 105. Further, filters may be selected, configured, and applied as shown in step 107. An image A is then generated based on the processing algorithms as shown in step 109. Steps 103, 105, 107, and 109 may be iterated for the selected volume any number of times to generate more images, e.g. images that enhance different tissues or features within the selected volume. In the illustrated example image B and image C are generated with different processing algorithms and/or configuration settings. The enhanced tissues or features from the images A, B, C are then extracted as shown in step 111, resulting in extracted feature images A', B', and C'. The extracted feature images are then combined to generate a composite image as shown in step 113.

Several features, aspects, embodiments and implementations have been described. Nevertheless, it will be understood that a wide variety of modifications and combinations may be made without departing from the scope of the inventive concepts described herein. Accordingly, those modifications and combinations are within the scope of the following claims.

What is claimed is:

1. An apparatus comprising:
a display; and
an image processing system that processes a three-dimensional dataset comprising voxels corresponding to a scanned volume wherein each voxel in said three-dimensional dataset has a first size, the image processing system configured to:
perform segmentation of said three-dimensional dataset to segment voxels within said three-dimensional dataset into a first group of voxels and a second group of voxels wherein the first group of voxels corresponds to a segmented structure and wherein the second group of voxels does not correspond to said segmented structure;
generate a configuration setting, wherein said configuration setting applies to at least one voxel of said first group of voxels,
wherein said configuration setting does not apply to said second group of voxels,
wherein said configuration setting causes said at least one voxel of said first group of voxels to change from said first size to a second size, and
wherein said second size is different from said first size;
apply said configuration setting to at least one voxel of said first group of voxels to cause said at least one voxel of said first group of voxels to change from said first size to said second size to generate a modified three-dimensional dataset; and
display said modified three-dimensional dataset to a user on said display,
wherein said at least one voxel of said first group of voxels has said second size, and
wherein said second group of voxels has said first size.

2. The apparatus of claim 1 further comprising adjusting a shape of said first group of voxels independently from a shape of said second group of voxels.

3. The apparatus of claim 1 further comprising adjusting an orientation of said first group of voxels independently from an orientation of said second group of voxels.

4. The apparatus of claim 1 further comprising adjusting a color of said first group of voxels independently from a color of said second group of voxels.

5. The apparatus of claim 1 further comprising temporally adjusting a display of said first group of voxels independently from a display of said second group of voxels.

6. An apparatus comprising:
a display; and
an image processing system that processes a three-dimensional dataset comprising voxels corresponding to a scanned volume wherein each voxel in said three-dimensional dataset has a first shape, the image processing system configured to:
perform segmentation of said three-dimensional dataset to segment voxels within the three-dimensional dataset into a first group of voxels and a second group of voxels wherein said first group of voxels corresponds to a segmented structure and wherein said second group of voxels does not correspond to said segmented structure;
generate a configuration setting,
wherein said configuration setting applies to at least one voxel of said first group of voxels,
wherein said configuration setting does not apply to said second group of voxels,
wherein said configuration setting causes said at least one voxel of said first group of voxels to change from said first shape to a second shape, and
wherein said second shape is different from said first shape;
apply said configuration setting to said at least one voxel of said first group of voxels to cause said at least one voxel of said first group of voxels to change from said first shape to said second shape to generate a modified three-dimensional dataset; and
display said modified three-dimensional dataset to a user on said display,
wherein said at least one voxel of said first group of voxels has said second shape, and
wherein said second group of voxels has said first shape.

7. The apparatus of claim 6 further comprising adjusting a size of said first group of voxels independently from a size of said second group of voxels.

8. The apparatus of claim 6 further comprising adjusting an orientation of said first group of voxels independently from an orientation of said second group of voxels.

9. The apparatus of claim 6 further comprising adjusting a color of said first group of voxels independently from a color of said second group of voxels.

10. The apparatus of claim 6 further comprising temporally adjusting a display of said first group of voxels independently from a display of said second group of voxels.

11. An apparatus comprising:
a display; and
an image processing system that processes a three-dimensional dataset comprising voxels corresponding to a scanned volume wherein each voxel in said three-dimensional dataset has a first orientation, the image processing system configured to:
perform segmentation of said three-dimensional dataset to segment voxels within said three-dimensional dataset into a first group of voxels and a second group of voxels wherein said first group of voxels corresponds to a segmented structure and wherein said second group of voxels does not correspond to said segmented structure;
generate a configuration setting,
wherein said configuration setting applies to at least one voxel of said first group of voxels,
wherein said configuration setting does not apply to said second group of voxels,
wherein said configuration setting causes said at least one voxel of said first group of voxels to change from said first orientation to a second orientation, and
wherein said second orientation is different from said first orientation;
apply said configuration setting to said at least one voxel of said first group of voxels to cause said at least one voxel of said first group of voxels to change from said first orientation to said second orientation to generate a modified three-dimensional dataset; and
display said modified three-dimensional dataset to a user on said display,
wherein said at least one voxel of said first group of voxels has said second orientation, and
wherein said second group of voxels has said first orientation.

12. The apparatus of claim 11 further comprising adjusting a size of said first group of voxels independently from a size of said second group of voxels.

13. The apparatus of claim 11 further comprising adjusting a shape of said first group of voxels independently from a shape of said second group of voxels.

14. The apparatus of claim 11 further comprising adjusting a color of said first group of voxels independently from a color of said second group of voxels.

15. The apparatus of claim 11 further comprising temporally adjusting a display of said first group of voxels independently from a display of said second group of voxels.

16. An apparatus comprising:
a display; and
an image processing system that processes a three-dimensional dataset comprising voxels corresponding to a scanned volume wherein each voxel in said three-dimensional dataset has a first displayed value, the image processing system configured to:
 perform segmentation of said three-dimensional dataset to segment voxels within the three-dimensional dataset into a first group of voxels and a second group of voxels wherein the first group of voxels corresponds to a segmented structure and wherein the second group of voxels does not correspond to said segmented structure;
 generate a configuration setting,
  wherein said configuration setting applies to at least one voxel of said first group of voxels,
  wherein said configuration setting does not apply to said second group of voxels,
  wherein said configuration setting causes said at least one voxel of said first group of voxels to change from said first displayed value to a second displayed value, and
  wherein said second displayed value is different from said first displayed value;
 apply said configuration setting to said at least one voxel of said first group of voxels to cause said at least one voxel of said first group of voxels to change from said first displayed value to said second displayed value to generate a modified three-dimensional dataset; and
 display said modified three-dimensional dataset to a user on said display,
  wherein said at least one voxel of said first group of voxels has said second displayed value, and
  wherein said second group of voxels has said first displayed value.

17. The apparatus of claim 16 further comprising adjusting a size of said first group of voxels independently from a size of said second group of voxels.

18. The apparatus of claim 16 further comprising adjusting a shape of said first group of voxels independently from a shape of said second group of voxels.

19. The apparatus of claim 16 further comprising adjusting an orientation of said first group of voxels independently from an orientation of said second group of voxels.

20. The apparatus of claim 16 further comprising temporally adjusting a display of said first group of voxels independently from a display of said second group of voxels.

21. An apparatus comprising:
 a display; and
 an image processing system that processes a three-dimensional dataset comprising voxels corresponding to a scanned volume wherein each voxel in said three-dimensional dataset has a first temporal display, the image processing system configured to:
 perform segmentation of said three-dimensional dataset to segment voxels within the three-dimensional dataset into a first group of voxels and a second group of voxels wherein the first group of voxels corresponds to a segmented structure and wherein the second group of voxels does not correspond to said segmented structure;
 generate a configuration setting,
  wherein said configuration setting applies to at least one voxel of said first group of voxels,
  wherein said configuration setting does not apply to said second group of voxels,
  wherein said configuration setting causes said at least one voxel of said first group of voxels to change from said first temporal display to a second temporal display, and
  wherein said second temporal display is different from said first temporal display;
 apply said configuration setting to said at least one voxel of said first group of voxels to cause said at least one voxel of said first group of voxels to change from said first temporal display to said second temporal display to generate a modified three-dimensional dataset; and
 display said modified three-dimensional dataset to a user on said display,
  wherein said at least one voxel of said first group of voxels has said second temporal display, and
  wherein said second group of voxels has said first temporal display.

22. The apparatus of claim 21 further comprising adjusting a size of said first group of voxels independently from a size of said second group of voxels.

23. The apparatus of claim 21 further comprising adjusting a shape of said first group of voxels independently from a shape of said second group of voxels.

24. The apparatus of claim 21 further comprising adjusting an orientation of said first group of voxels independently from an orientation of said second group of voxels.

25. The apparatus of claim 21 further comprising adjusting a color of said first group of voxels independently from a color of said second group of voxels.

\* \* \* \* \*